United States Patent [19]

Haigh et al.

[11] Patent Number: 5,648,845
[45] Date of Patent: Jul. 15, 1997

[54] APPARATUS FOR VERIFYING THE PERFORMANCE OF OPTICAL FIBRE MEASUREMENT EQUIPMENT

[75] Inventors: Neil Richard Haigh, Eastham; Charles Edward Jones, West Molesey, both of United Kingdom

[73] Assignee: The Secretary of State for Trade and Industry, London, England

[21] Appl. No.: 524,071

[22] Filed: Sep. 6, 1995

[30] Foreign Application Priority Data

Sep. 7, 1994 [GB] United Kingdom ............... 9418055

[51] Int. Cl.⁶ ........................... G01N 21/15; B65D 85/04
[52] U.S. Cl. ..................... 356/73.1; 356/243; 385/135
[58] Field of Search ....................... 356/73.1, 243; 385/134, 135

[56] References Cited

U.S. PATENT DOCUMENTS

| | | | |
|---|---|---|---|
| 4,167,328 | 9/1979 | Cross et al. ................ | 356/243 X |
| 4,309,105 | 1/1982 | Lebduska ................... | 356/73.1 |
| 4,846,343 | 7/1989 | Rupert ....................... | 385/135 X |

FOREIGN PATENT DOCUMENTS 58-192009  11/1983  Japan ............................. 385/135

*Primary Examiner*—Vincent P. McGraw
*Attorney, Agent, or Firm*—Iandiorio & Teska

[57] ABSTRACT

Apparatus (2) for verifying the performance of optical fibre measurement equipment, comprising a housing (4), a length of optical fibre (6) in a main storage compartment (8), a first compartment (10) containing a first end (12) of the optical fibre (6) that is in the main storage compartment (8), and a second compartment (14) containing a second end (16) of the optical fibre (6) that is in the main storage compartment (8), the optical fibre (6) being stored under substantially zero tension, the first end (12) of the optical fibre (6) being a source end of the optical fibre (6), and the second end (16) of the optical fibre (6) being a detector end of the optical fibre (6).

7 Claims, 3 Drawing Sheets

APPARATUS FOR VERIFYING THE PERFORMANCE OF OPTICAL FIBRE MEASUREMENT EQUIPMENT

This invention relates to apparatus for verifying the performance of optical fibre measurement equipment.

The measurement of the loss of light through an optical fibre is known as spectral attenuation. This measurement of the loss of light through an optical fibre is of paramount importance to fibre manufacturing, fibre cabling and fibre installation processes.

Internationally agreed standards detail a cut-back technique as a reference test method for the measurement of the loss of light through an optical fibre. This cut-back technique is performed by launching monochromatic light into one end of a long length of optical fibre, and recording the optical power emitted from the other end of the optical fibre as a function of wavelength. The optical fibre is then cut back to a short length, for example a few meters, without disturbing the launch conditions and again the emitted optical power is recorded as a function of wavelength. The spectral attenuation of the fibre is calculated by taking the logarithmic ratio of the two sets of measurements.

Optical fibre users seek traceability from establishments in various countries providing national standards. The optical fibre users seek traceability to demonstrate the validity of performance specifications of their products. The traceability for optical fibre attenuation measurements is obtained from national reference facilities operated by the establishments by the use of a proven reliable transfer standard.

It is an aim of the present invention to provide apparatus for enabling the establishment of an attenuation transfer standard.

Accordingly, the present invention provides apparatus for verifying the performance of optical fibre measurement equipment, which apparatus comprises a housing, a length of optical fibre in a main storage compartment, a first compartment containing a first end of the optical fibre that is in the main storage compartment, and a second compartment containing a second end of the optical fibre that is in the main storage compartment, the optical fibre being stored under substantially zero tension, the first end of the optical fibre being a source end of the optical fibre, and the second end of the optical fibre being a detector end of the optical fibre.

The apparatus of the invention may be readily packaged and transported world wide for the calibration of optical fibre measurement equipment such for example as spectral scan systems and optical time domain reflectometers. The apparatus of the invention may be calibrated using the cut-back technique mentioned above. Users of the apparatus can then measure the spectral attenuation using their measurement equipment, and they can then compare their measured values with the calibrated values of the apparatus of the invention, thereby providing a check on the accuracy of their measurement equipment.

Usually, the main storage compartment will be sealed.

The apparatus may be one in which the main storage compartment is larger than the first and the second compartments. The main storage compartment may be positioned underneath the first and the second compartments. Alternatively, all the compartments may be on the same level.

The apparatus is one in which the length of the optical fibre in the main Storage compartment is wound in a circle, in which the first end of the optical fibre in the first compartment is wound in a circle, in which the second end of the optical fibre in the second compartment is wound in a circle, and in which the circle in the main storage compartment is larger than the two circles in the first and the second compartments. Such a configuration avoids tight optical fibre bends which can adversely affect the accuracy of measurements. The apparatus may be one in which the circle in the main storage compartment has a diameter of at least 28 cm, and in which the circles in the first and the second compartments have a diameter of at least 14 cm. Such circle sizes again help to avoid optical fibre bends which can adversely affect measurements.

The first end of the optical fibre in the first compartment and the second end of the optical fibre in the second compartment may each be 200 m long. Other lengths for the first and the second ends of the optical fibre may be employed if desired.

The optical fibre may have end connectors. Alternatively, the optical fibre may be provided without end connectors.

The housing is preferably a water-resistant carrying case. Other types of housing may be employed.

Embodiments of the invention will now be described solely by way of example and with reference to the accompanying drawings in which.

Figure 1:
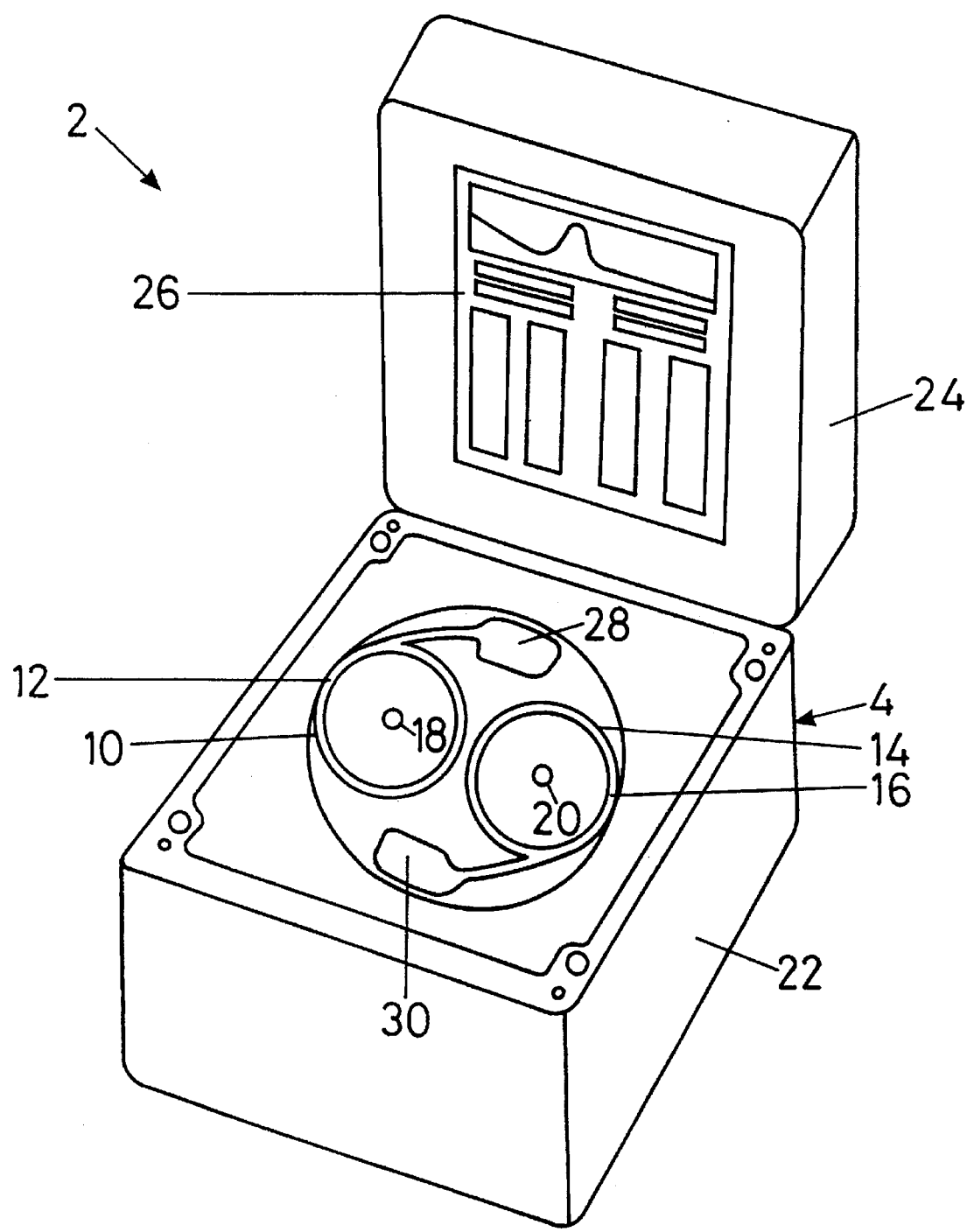
FIG. 1 is a perspective view of apparatus for verifying the performance of optical fibre measurement equipment.
Figure 2:
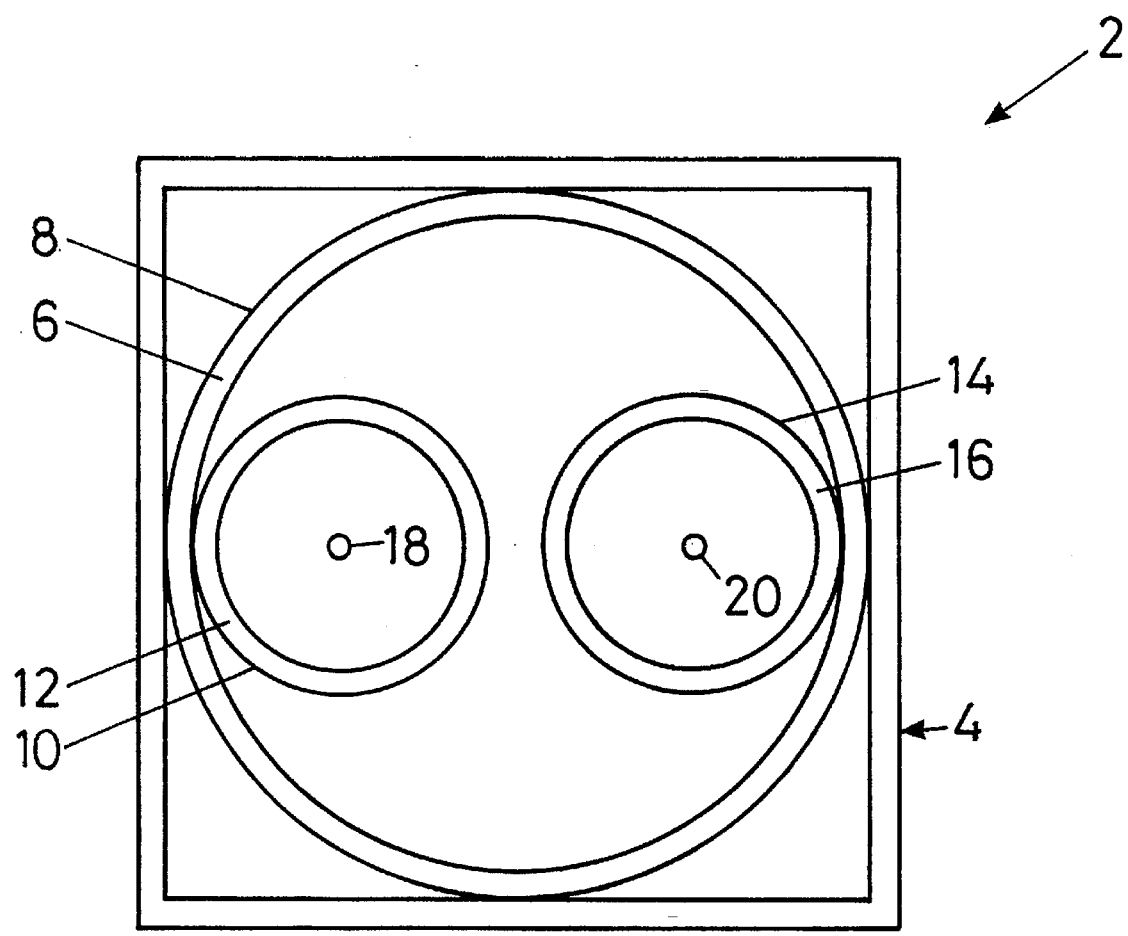
FIG. 2 is a plan view of part of the apparatus shown in FIG. 1 and illustrates the configuration of an optical fibre used in the apparatus.
Figure 3:
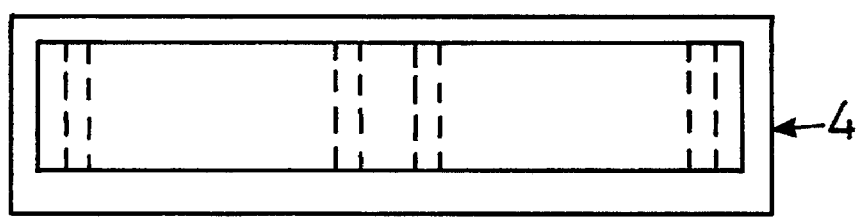
FIG. 3 is a cross section through the part of the apparatus shown in FIG. 2.

Referring to FIG. 1–3, there is shown apparatus 2 for verifying the performance of optical fibre measurement equipment (not shown). The apparatus 2 comprises a housing 4, a length of optical fibre 6 in a main storage compartment 8, a first compartment 10 containing a first end 12 of the optical fibre 6 that is in the main storage compartment 8, and a second compartment 14 containing a second end 16 of the optical fibre 6 that is in the main storage compartment 8. The optical fibre 6 is stored under substantially zero tension. The first end 12 of the optical fibre 6 is a source end of the optical fibre, and the second end 16 of the optical fibre 6 is a detector end of the optical fibre. The first compartment 10 forms a lead-in optical fibre compartment, whilst the second compartment 14 forms a lead-out optical fibre compartment. The extreme source end of the first end 12 is shown as source end 18, and the extreme detector end of the second end 16 is shown as detector end 20.

Figure 4:
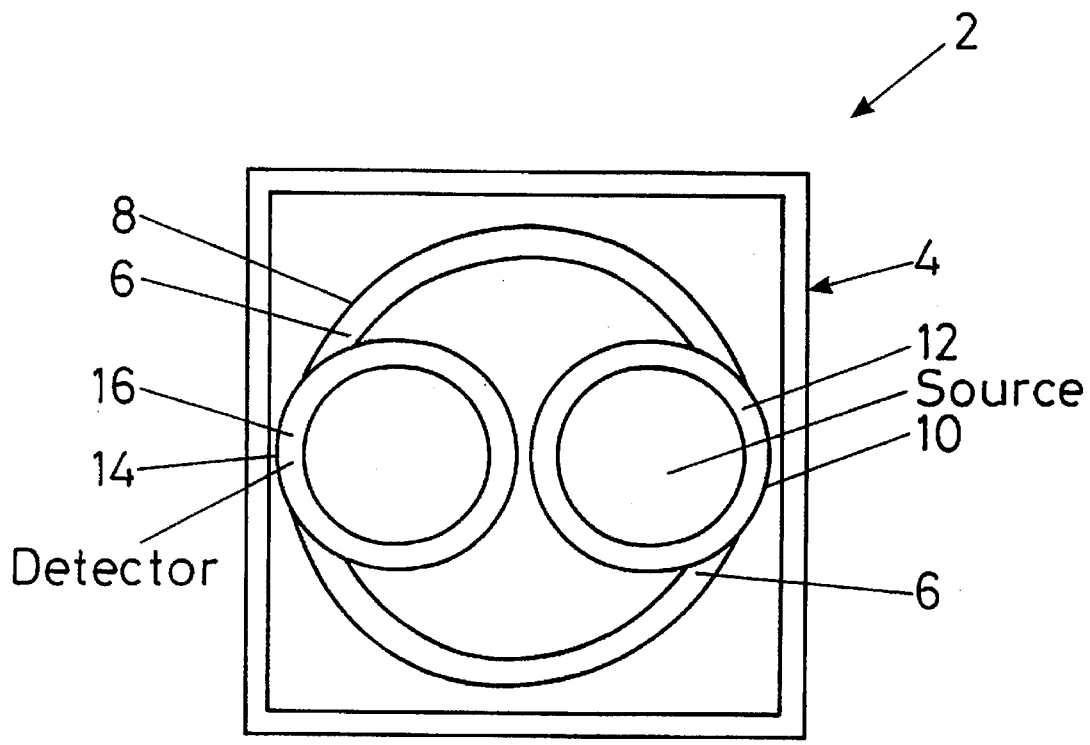
FIG. 4 is a plan view like FIG. 2 and shows an alternative configuration.
Figure 5:
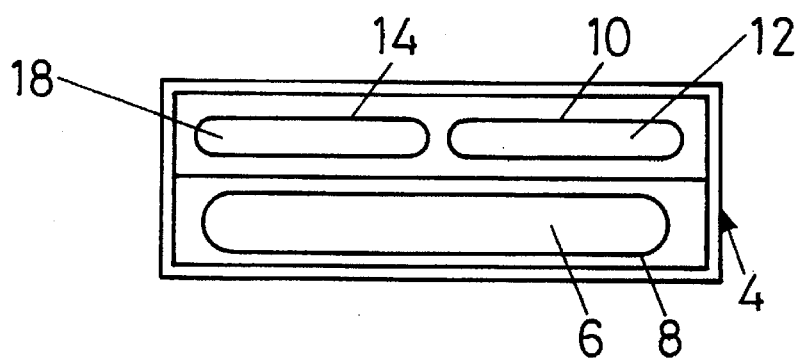
FIG. 5 is a cross section through the part of the apparatus shown in FIG. 4.

An alternative arrangement to that shown in FIGS. 2 and 3 is shown in FIGS. 4 and 5. In FIGS. 4 and 5, it will be seen that the first and the second compartments 10, 14 are positioned above the main storage compartment 8, whereas in FIGS. 2 and 3 all the compartments 8, 10, 14 are at the same level. In all Figures, the main storage compartment 8 and the first and the second compartments 10, 14 are circular in plan. In FIGS. 4 and 5, it will be noticed that the position of the first and the second compartments 10, 14 is reversed as compared with FIGS. 2 and 3.

The main storage compartment 8 is a sealed main storage compartment. As can be seen from the drawings, the main storage compartment 8 is larger than the first and the second compartments 10, 14. As can also be seen from the drawings, the optical fibre 6 in the main storage comparment 8 is wound in a circle, the first end 12 of the optical fibre 6 in the first compartment 10 is wound in a circle, the second end 16 of the optical fibre 6 in the second compartment 14 is wound in a circle, and the circle in the main storage compartment 8 is larger than the two circles in the first and the second compartments 10, 14. The circles in the first and the second compartments 10, 14 are of equal diameter. The circle in the main storage compartment 8 has a diameter of 28 cm. The circles in the first and the second compartments 10, 12 each have a diameter of 14 cm. The first end 12 and the second end 16 of the optical fibre 6 are each 200 m long.

Because the main storage compartment 8 is sealed, it will be appreciated that the optical fibre 6 therein is normally inaccessible to the user.

The housing 4 is in the form of a water-resistant carrying case having a body portion 22 and a lid 24. The first end 12 of the optical fibre 6 and the second end 16 of the optical fibre 6 are user accessible. The body portion 22 is 400 mm long from side to side, and is 405 mm long from front to back. The body portion 22 is 120 mm deep. The body portion 22 may be made from a plastics material. Any suitable and appropriate plastics material may be employed.

The inside of the lid 24 is provided with a data sheet 26 as shown in FIG. 1.

FIG. 1 illustrates how the first compartment 10 has a lead-in portion 28, whilst the second compartment 14 has a lead-out portion 30 for the optical fibre 6.

The optical fibre 6 is stored under zero tension in the body portion 22. The bulk of the optical fibre 6 is stored in a 28 cm diameter loop that is inaccessible to the user in the main storage compartment 8. The optical fibre 6 is placed in the main storage compartment 8 by winding it under tension on to a collapsible drum. The drum is then collapsed leaving a tower of fibre. The tower of fibre is provided with talc which destroys the static potential attraction between the turns of optical fibre, resulting in the optical fibre collapsing into the main storage compartment 8 under substantially zero tension.

The circles of the first end 12 and the second end 16 of the optical fibre 6 are each of approximately 200 m in length. These first and second ends 12, 16 are accessible to the user. The source end 18 is where light is launched into the optical fibre 6. The detector end 20 is the output end for the light. The ends of the optical fibre 6 may be either terminated with a connector or left bare.

The apparatus 2 may use any single-mode or multi-mode optical fibre 6. Where single mode optical fibres are employed, then these may be matched-clad, depressed-clad, dispersion-shifted or dispersion-flattened. Multi-mode optical fibre designs may include step index designs and graded index desists.

If desired, the optical fibre layout design may incorporate mode filters.

The apparatus 2 is calibrated using the above mentioned internationally recognised cut-back measurement technique. The calibration procedure is as follows
Stage 1:

Both ends of the optical fibre 6 cleaved and inspected to ensure that the end faces are perpendicular to the optical axis of the optical fibre and are clean.

Monochromatic light of wavelength λ is launched into the source end 18. This light may be generated by a white light source and suitable filter or a laser. A mode filter is inserted in this lead in length of optical fibre, within 30 cm of the end. Typically this will consist of a turn of the optical fibre in a 60 mm diameter loop.

The end 20 is placed in a power meter to measure the power of light exiting the optical fibre. This power is recorded as $P_1$ (λ). Cladding mode strippers may be employed to ensure that no light propagates through the cladding of the optical fibre. This is repeated for many different wavelengths of light. Typically the wavelength range covered in a measurement set is 1200 nm to 1700 nm in steps of 5 nm or less.
Stage 2:

After stage 1, the optical fibre 6 is cut at a distance of approximately 2 m from the source end 18. This end is cleaved and inspected to ensure that the end face is perpendicular to the optical axis of the fibre and is clean. It is important that the launch conditions do not change during this operation. This cut end is placed in the power meter and the power exiting this short length of fibre is recorded at $P_2$ (λ) for each of the wavelength points measured in stage 1.
Stage 3:

The total optical lose of attenuation A (λ) for each measured wavelength is calculated from the ratio of these measured powers using the following formula:

$$A(\lambda) = 10 \, \text{Log}[P_1(\lambda)/P_2(\lambda)] \, dB$$

These attenuation values are tabulated and a certificate of calibration produced. These results are also displayed on the data sheet 26 on the inside of the lid 24 of the apparatus 2.
Transfer of Calibration:

The apparatus 2 can be used to check the performance of any equipment designed to measure the attenuation of optical fibre. Examples of such instruments include spectral scan benches, optical time domain reflectometers, and loss meters. The apparatus 2 is such that it fully protects the optical fibre 6.

The equipment under test may be used to measure the attenuation of the attenuation apparatus 2 following the procedure given by the equipment manufacturer. These measured values can then be compared with the certified values supplied by the national standards establishment. Alternatively, the apparatus 2 can be measured at regular intervals by the equipment to check that the values obtained by the equipment do not change.

It is to be appreciated that the embodiments of the invention described above with reference to the accompanying drawings have been given by way of example only and that modifications may be effected.

We claim:

1. Apparatus for verifying the performance of optical fibre measurement equipment, which apparatus comprises a housing, a length of optical fibre in a main storage compartment, a first compartment containing a first end of the optical fibre that is in the main storage compartment, and a second compartment containing a second end of the optical fibre that is in the main storage compartment, and the appratus being one in which the optical fibre is stored under substantially zero tension, the first end of the optical fibre is a source end of the optical fibre, the second end of the optical fibre is a detector end of the optical fibre, the length of the optical fibre in the main storage compartment is wound in a circle, the first end of the optical fibre in the first compartment is wound in a circle, the second end of the optical fibre in the second compartment is wound in a circle, and the circle in the main storage compartment is larger than the two circles in the first and the second compartments.

2. Apparatus according to claim 1 in which the main storage compartment is sealed.

3. Apparatus according to claim 1 in which the main storage compartment is larger than the first and the second compartments.

4. Apparatus according to claim 1 in which the circle in the main storage compartment has a diameter of at least 28 cm, and in which the circles in the first and the second compartments have a diameter of at least 14 cm.

5. Apparatus according to claim 4 in which the first end of the optical fibre in the first compartment and the second end of the optical fibre in the second compartment are each 200 m long.

6. Apparatus according to claim 1 in which the optical fibre has end connectors.

7. Apparatus according to claim 1 in which the housing is a water-resistant carrying case.

* * * * *